UNITED STATES PATENT OFFICE.

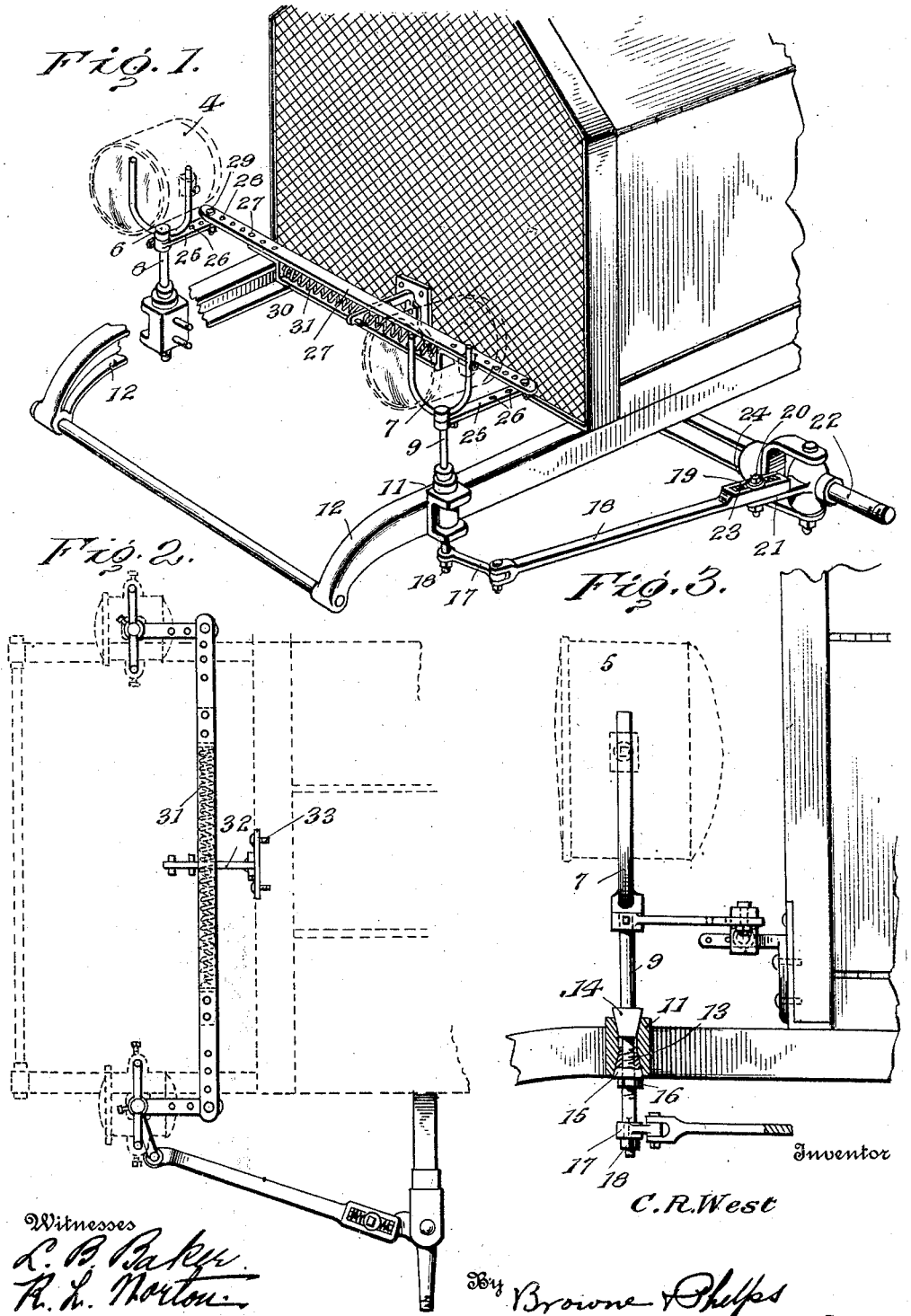

CARL R. WEST, OF WASHINGTON, INDIANA.

ATTACHMENT FOR AUTOMOBILES.

986,613.  Specification of Letters Patent.  Patented Mar. 14, 1911.

Application filed December 8, 1910. Serial No. 596,369.

*To all whom it may concern:*

Be it known that I, CARL R. WEST, a citizen of the United States, residing at Washington, in the county of Daviess and State of Indiana, have invented certain new and useful Improvements in Attachments for Automobiles, of which the following is a specification.

My invention relates to an attachment for automobiles by means of which the lamps or search lights carried by the automobile will be automatically shifted to follow the track as the steering gear is manipulated, and which will prevent the vibrations of the steering gear, due to the machine traveling over inequalities in the road vibrating the lamps.

The great objection in having the search lights of automobiles connected with the steering gear so as to turn therewith has been that the vibrations of the steering wheels and their slight motion, due to going over ruts or other inequalities in the road are all transmitted to the search lights, causing them to dance, which interferes with the proper lighting of the roadway ahead of the machine. By my invention the slight movements of the steering wheels are not transmitted to the search lights, but are absorbed before reaching the same, and only a turning of the wheels sufficient to effect a material change in direction of the machine will produce any turning movement of the lights, consequently when the machine is being driven straight ahead the lights will remain steady, although the machine may be traveling over rough roads, and as a consequence thereof the steering wheels constantly moving slightly out of their plane.

With these and other objects in view my invention consists in certain constructions, combinations and arrangements of parts, the preferred form of which will be first described in connection with the accompanying drawings and then the invention particularly pointed out in the appended claims.

Referring to the drawings wherein the same part is designated by the same reference numeral wherever it occurs, Figure 1 is a perspective view of the forward portion of an automobile showing a pair of search lights connected to one of the steering knuckles in accordance with my invention; Fig. 2 is a plan view of the construction shown in Fig. 1, and Fig. 3 is an enlarged detail, partly in elevation, and partly in vertical section, illustrating my preferred manner of mounting the lamp supports.

4, 5 designate a pair of lamps supported in the harps 6, 7, having shanks 8, 9 extending through brackets 10, 11, suitably secured as by rivets or bolts, to the side bars 12 of the automobile frame.

Preferably, and as shown, each of the shanks 8 and 9 of the harps 6 and 7 is journaled in its bracket 10, 11, by providing the bracket with a double conical bore 13, through which the shank passes, and securing on the shank a pair of oppositely facing cones 14, 15, which extend into the conical bores of the bracket, as best illustrated in Fig. 3. Preferably, and as shown, the cone 14, is formed integral with the shank, and the cone 15 is threaded on the shank and held in position by a lock nut 16. The lower end of one of the shanks 9 is squared to receive a crank arm 17, held in place upon the shank by means of a nut 18. Connected, preferably by means of a knuckle joint to the outer end of the crank arm 17, is one end of an arm 18, the other end of which is provided with a slot or way 19 into which extends a pin 20 carried by a lug 21 projecting forwardly from the swivel of the forward axle 22. Mounted in the slot 19, on opposite sides of the pin 20 are a pair of springs 23 which bear against opposite sides of the pin 20 and against the ends of the slots, whereby the pin 20 is normally held in the central portion of the slot, and slight movements of the pin 20, due to slight movements of the axle 22, will not be transmitted to the bar 18, but will be absorbed by the springs. A movement, however, of the axle 22, sufficient to materially change the course of the machine, will be transmitted to the bar 18.

In order to securely hold the pin 20 in the slot 19 I preferably form the pin with a head 24 which, in the form shown, is a nut screwed onto the end of the pin. Mounted on each of the shanks 8 and 9 of the lamp harps is a rearwardly extending arm 25, preferably provided with a series of holes 26, by means of which the opposite ends of the bar 27, having a plurality of holes 28 may be connected by means of the bolts 29 which, by connecting the bar 27 to the arms 25 by means of the holes 26 and 28 the lamps may be brought so that they will throw their rays parallel to each other, and the lamp 4 be caused to move in unison with the lamp 5.

As a further means of preventing the vibration of the lamps, and also to provide a construction which will always tend to hold the lamps so as to throw their rays straight ahead, I have provided a U-shaped plate 30, secured to the under side of the bar 27, in which are mounted a pair of springs 31 adapted to bear upon opposite sides of an arm 32, extending out from a bracket 33, preferably secured to the front of the machine. By adjusting the bar 27 longitudinally on the arms 25 the tension of the springs 31 on opposite sides of the arm 32 may be so adjusted that the springs will have an equal tension when the lamps are facing straight ahead of the machine.

From the foregoing construction it will be seen that slight movements, due to vibration of the axle 22, will not be transmitted to the lamps, and that consequently the lamps will remain as steady as if they had no connection with the axle of the machine, but that when the axle is given a sufficient movement to materially change the direction in which the machine is going, the lamps will be given a corresponding movement and so follow the track of the machine.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In an attachment for moving automobile lamps synchronously with the forward wheels of an automobile while preventing the vibrations of the wheels being transmitted to the lamps, the combination with a pair of lamps mounted in suitable yokes provided with shanks, of brackets in which such shanks are journaled, said brackets being adapted to be secured to the side bars of the automobile, an arm extending from each of the shanks, a bar connecting the shanks together, an extension secured on a stationary part of the automobile, a pair of springs carried by the connecting bar and engaging opposite sides of the extension, and means connecting one of the shanks with the forward axle of the automobile, for the purpose set forth.

2. In an attachment for moving automobile lamps synchronously with the forward wheels of an automobile while preventing the vibrations of the wheels being transmitted to the lamps, the combination with a pair of lamps mounted in suitable yokes provided with shanks, of brackets in which such shanks are journaled, said brackets being adapted to be secured to the side bars of the automobile, an arm extending from each of the shanks, a bar connecting the arms together, an extension secured on a stationary part of the automobile, a pair of springs carried by the connecting bar and engaging opposite sides of the extension, an arm connecting one of said shanks with one of the forward axles, a spring interposed in said connection to absorb the vibrations of the axle.

3. In an attachment for moving automobile lamps synchronously with the forward wheels of an automobile while preventing the vibrations of the wheels being transmitted to the lamps, the combination with a pair of lamps mounted in suitable yokes provided with shanks, of brackets in which such shanks are journaled, said brackets being adapted to be secured to the side bars of the automobile, a pair of arms, one extending from each of said shanks, a bar pivotally connecting said arms and provided with means for varying the points of connection between said bar and arms, a U-shaped plate secured to the connecting bar, a part extending into the space between the U-shaped plate and the connecting bar, and a pair of springs mounted in said space and bearing against opposite sides of said projecting part, for the purpose set forth.

In testimony whereof I affix my signature in presence of two witnesses.

CARL R. WEST.

Witnesses:
GRENEL FAITH,
WM. M. YOUNG.